United States Patent [19]

Avrea et al.

[11] 4,230,336
[45] Oct. 28, 1980

[54] BALL COMPONENT FOR COUPLING APPARATUS

[76] Inventors: Walter C. Avrea, 1405 Whalers Way, Tempe, Ariz. 85283; Robert N. Hansen, 14 W. Main, Avondale, Ariz. 85323

[21] Appl. No.: 965,690

[22] Filed: Dec. 4, 1978

[51] Int. Cl.³ .............................................. B60D 1/06
[52] U.S. Cl. ..................................... 280/507; 151/27; 280/511
[58] Field of Search ....................... 280/504, 507, 511; 403/320, 343; 151/27, 28

[56] References Cited

U.S. PATENT DOCUMENTS

| 779,482 | 1/1905 | Kovalek | 151/27 |
| 1,002,452 | 9/1911 | Rickards | 151/27 X |
| 1,058,583 | 4/1913 | Hart | 151/27 |
| 1,212,126 | 1/1917 | Canfield | 151/27 |
| 3,473,826 | 10/1969 | Elliott et al. | 280/511 X |
| 3,759,548 | 9/1973 | Kothmann | 280/511 |

Primary Examiner—John J. Love
Assistant Examiner—Michael Mar
Attorney, Agent, or Firm—Don J. Flickinger

[57] ABSTRACT

An attachment bolt extends upwardly through a support member and threadedly engages the ball component of a coupling apparatus. A locking member extends downwardly through the ball component and cammingly engages the attachment bolt with the pitch different than the threaded engagement between the ball component and the attachment bolt. Engagement of the ball component within a complemental coupler component prevents access to and removal of the locking member.

7 Claims, 6 Drawing Figures

U.S. Patent
Oct. 28, 1980
4,230,336
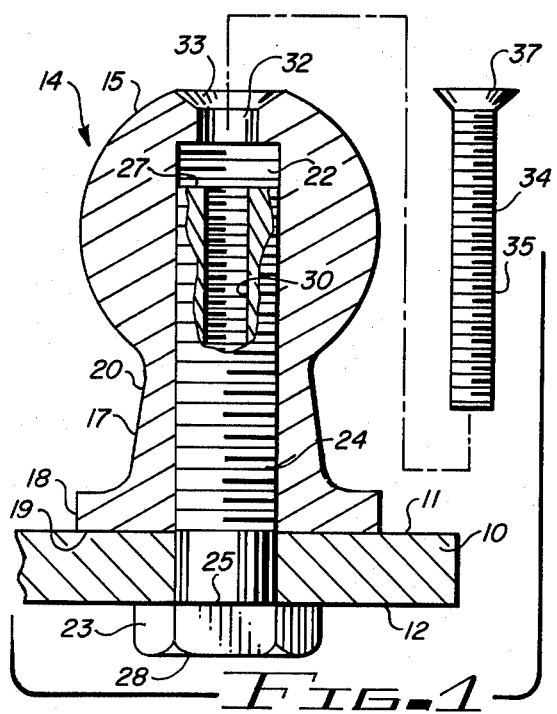
FIG-1
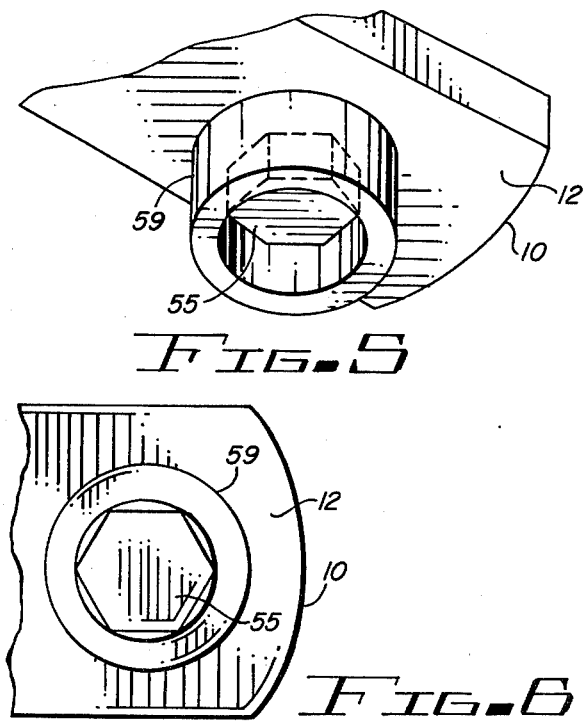
FIG-5
FIG-6
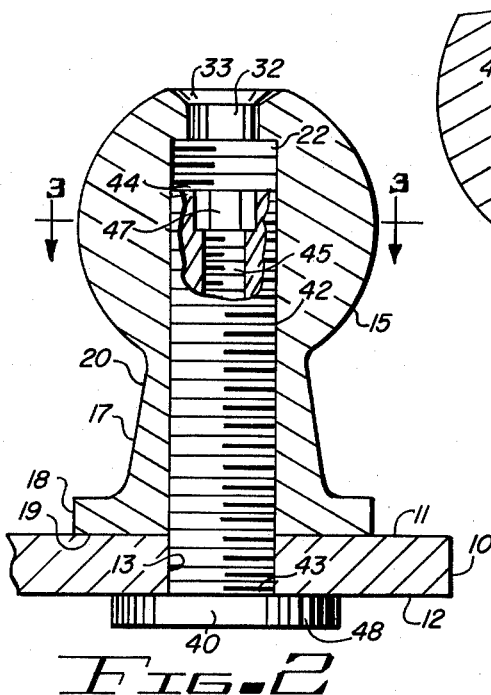
FIG-2
FIG-3
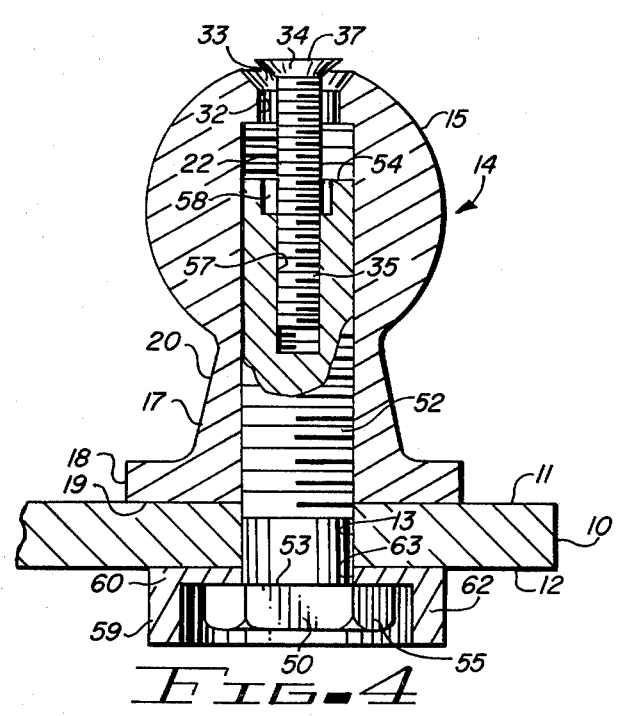
FIG-4

BALL COMPONENT FOR COUPLING APPARATUS

This invention relates to coupling apparatus.

In a further aspect, the present invention relates to coupling apparatus of the type having a ball component which is detachably engageable with a complemental coupler component.

More particularly, the present invention concerns an improved ball component incorporating anti-theft means.

Frequently, a powered motor-driven vehicle, such as an automobile, truck or tractor, is employed to pull or tow a non-powered coaster vehicle, such as a utility trailer, mobile home or another motor-driven vehicle. Various types of well known coupling apparatus are commercially available for detachably securing the non-powered coaster vehicle, generally referred to as a towed vehicle, to the powered motor-driven vehicle, generally referred to as a towing vehicle. Of immediate concern is the universally familiar ball and socket coupling apparatus.

The ball is part of a ball component affixed to a towing vehicle. In a specific but exemplary arrangement, a subframe assembly, termed a hitch, is secured to the towing vehicle. Extending from the hitch is a support member, usually a flat metal plate, having an opening therethrough. The ball component includes a base which rests upon the support member. An attachment bolt extends upwardly through the opening in the support member and threadedly engages the ball component.

The socket is part of a coupler component affixed to the towed vehicle. Generally the coupler is secured to the tongue, usually a forward extension of the frame, of the towed vehicle. Included in the coupler is a manually operable clamping arrangement which retains the ball within the socket.

Frequently, the two vehicles, joined by the coupling apparatus, are stored or left unattended for extended periods of time. During such periods, possible theft of the towed vehicle is a source of general concern. Certain anti-theft precautions have been evolved by vehicle operators. For example, it is common practice to pass a chain between the towing vehicle and the towed vehicle and secure the chain with a padlock.

As an anti-theft precaution, however, chains have been proven to be relatively ineffective. A chain link is quickly severed by cutting or sawing by common well known tools generally carried by those intent upon theft.

Commercially, the prior art has also provided anti-theft schemes. Exemplary is the coupler component in which the clamping device for embracing the ball can be locked in the engaged position. Also available is a lockable bracket device secured to the support component and having an arm which extends over the coupler component, thereby preventing the upward movement necessary to remove the coupler component from the ball component. Padlocks, usually being of hardened steel, are not readily severed and are, therefore, considered to provide protection.

A coupler component is usually permanently secured by welding to the tongue of the towed vehicle. Permanent attachment of the ball component to the support member is highly impractical. Towed vehicles are equipped with couplers having variously sized sockets. Accordingly, appropriately sized ball components are replaced upon a single support member. Removal and replacement of the ball component is a readily and conveniently performable task.

Accordingly, with equal speed and ease, the ball component, with coupler component attached and secured by padlock, can be removed from a given towing vehicle and subsequently attached to another towing vehicle. Most towed vehicles, even those weighing several thousand pounds, are easily moved for short distances by manual means. Therefore, in an exceedingly short time, the thief can remove the ball component with towed vehicle in tact from the designated towing vehicle, move the towed vehicle slightly, attach the ball component to the support member of another towing vehicle, and drive away with his newly acquired possession.

It would be highly advantageous, therefore, to remedy the long standing deficiencies of the prior art.

Accordingly, it is an object of the present invention to provide an improved coupling apparatus of the type having a ball component and a complemental coupler component.

Another object of the invention is the provision of a coupling apparatus having theft retarding means.

And another object of the invention is to provide an improved ball component having a locking element, which, under certain conditions, prevents removal of the attachment bolt.

Still another object of this invention is the provision of an improved coupling apparatus in which the ball component cannot be removed from the support member when engaged with the coupler component.

And still another object of the invention is to provide anti-theft improvements which are compatible with commercially available prior art coupling apparatus.

Yet another object of the invention is the provision of improvements which can be included into newly manufactured ball components, or, alternately, can be used to modify pre-existing ball components.

A further object of the instant invention is to provide a locking element which is rotatably and cammingly engageable with an attachment bolt.

In a further object of the invention is the provision of an improved ball component which can be optionally manufactured for assembly with conventional tools or with non-conventional tools.

Still a further object of the invention is to provide anti-theft provisions which are relatively inexpensive to incorporate into coupling apparatus.

And still a further object of the invention is the provision of an improved ball component according to the above which is readily and conveniently attached or removed by authorized persons.

Briefly, to achieve the desired objects of the instant invention in accordance with a preferred embodiment thereof, first provided is a locking member having an elongate shank with a head at one end thereof. A bore is formed downwardly through the ball element coaxial with the internally threaded bore which receives the attachment bolt. A male element of a male-female connection pair carried by the shank of the locking member is engageable with a female element of the male-female connection pair, formed into the upper end of the shank of the attachment bolt.

In a more specific embodiment, the male-female connection pair are cammingly engageable. The pitch of the cam engagement is different than the pitch of the threaded engagement between the ball component and the attachment bolt. Accordingly, it is necessary that the locking member be withdrawn prior to removal of the attachment bolt from the ball component. The head of the locking member, which is adapted to receive a rotating and removal tool, is not accessible when the ball element is engaged with a complemental coupler component.

The foregoing and further and more specific objects and advantages of the instant will become readily apparent to those skilled in the art from the following detailed description of preferred embodiments thereof, taken in conjunction with the drawings, in which:

FIG. 1 is a vertical sectional view, partly exploded, of an improved ball component constructed in accordance with the teachings of the instant invention as it would appear when attached to the support member of a conventional hitch, the support member being partly broken away;

FIG. 2 is an illustration generally corresponding to the view of FIG. 1, and illustrating another embodiment of the instant invention;

FIG. 3 is a horizontal sectional view taken along the line 3—3 of FIG. 2;

FIG. 4 is a vertical sectional view of yet another improved ball component, embodying the principles of the instant invention, as it would appear when attached to a conventional support member;

FIG. 5 is a "worm's-eye" perspective view of the embodiment of FIG. 4; and

FIG. 6 is a bottom plan view taken from the illustration of FIG. 5.

Turning now to the drawings, in which like reference numerals indicate corresponding elements throughout the several views, attention is first directed to FIG. 1, which shows the support member 10 of a conventional hitch apparatus. Although not specifically herein shown, but as will be readily understood by those skilled in the art, support member 10 extends from a sub-frame assembly. The apparatus, commonly termed a hitch, is commercially available as an accessory item and, according to design, is adapted to be attached to the main frame, bumper or other appropriate part of the towing vehicle. It will also be appreciated that support member 10 may be formed into the bumper of the towing vehicle, which practice is especially common in connection with trucks. In general, support member 10 is a sturdy metallic plate, having top surface 11, bottom surface 12 and opening 13 therethrough.

The instant invention is concerned with an improved ball component, generally designated by the reference character 14, which, in similarity to conventional ball components, includes ball element 15 supported by base 17. Base 17 includes flange portion 18 having base surface 19 which rests upon top surface 11 of support member 10. Shank 20 extends upwardly from flange portion 18 and carries ball element 15, which is sized and shaped to receive the socket of a conventional coupler component.

The ball component, taken together with the coupler component, comprises a coupling apparatus for detachably securing a towed vehicle to a towing vehicle. As will be further appreciated by those skilled in the art, coupling components, usually attached to tongues extending from towed vehicles, are commercially available in various configurations. Commonly, coupling components include a socket for receiving the ball element and a manually operable clamping arrangement for retaining the ball element within the socket. The coupler component may also include facilities for receiving a padlock for securing the clamping arrangement in the engaged configuration.

Typically, ball component 14 includes an internally threaded bore 22 extending upwardly from base surface 19. Bore 22 is blind and does not pass through ball element 15. Further, in accordance with conventional practice, ball component 14 is attached to support member 10 by attachment bolt 23, which includes externally threaded shank 24, having first end 25 and second end 27. Head 28, a conventional bolt head adapted to receive a wrench, is carried at first end 25. Externally threaded shank 24 passes upwardly through opening 13 and matingly engages internally threaded bore 22 with head 28 drawn against bottom surface 12 of support member 10.

Ball elements and attachment bolts, as exemplified by the illustration of FIG. 1, are commercially available in various sizes and design configurations. A ball element 15, having a diameter of two inches, is considered to be representative. Typically, externally threaded shank 24 will have an outside diameter of 0.750 inch and be threaded at a pitch of ten threads per inch.

In accordance with the immediate embodiment of the instant invention, a female, or internal, thread 30, as machined by the operations of drilling and tapping, is coaxially formed into shank 24 from second end 27. Bore 32 is formed, as by drilling, through ball element 15 into internally threaded bore 22. Bore 32, which includes countersunk portion 33, is also coaxial with externally threaded shank 24.

Attachment bolt 23 is secured to ball components 14 by a locking member, herein specifically illustrated as machine screw 34. Machine screw 34 includes an elongate, externally threaded shank 35 having a head 37 at one end thereof. Externally threaded shank 35 is matingly engageable within internally threaded bore 30. Bore 32 is sized to loosely receive shank 35 therethrough. Head 37, being of the countersunk type, nests within countersunk portion 33.

The pitch of the threads on shank 35 of machine screw 34 are different than the pitch of the threads on shank 24 of attachment bolt 23. For example, shank 35 may have a nominal 0.312 inch diameter and carry eighteen threads per inch. Utilizing the foregoing exemplary thread pitches, machine screw 34 is advanced into attachment bolt 23 at the rate of one inch per eighteen revolutions. Attachment bolt is withdrawn from ball component 14 at the rate of one inch per ten revolutions. It will be appreciated, therefore, that attempted rotation of attachment bolt 23 will cause a jamming situation, wherein head 37 is drawn tightly against countersunk section 33 and further rotation of attachment bolt 23 is prohibited. It is seen, therefore, that removal of machine screw 34 must precede separation of attachment bolt 23 from ball component 14. When ball element 15 is received within the socket of a complemental coupler component, access to machine screw 34, for the purposes of removal, is denied.

It is within the scope of the instant invention that removal of attachment bolt 23 from ball component 14 can be rendered difficult during those times when ball element 15 is not engaged within the socket of a coupler component. Head 37 of bolt 34, in accordance with conventional practice, includes means for receiving a rotating and driving tool. Head 37 may include a simple slot for receiving a conventional and readily available flat blade screwdriver. In contrast, head 37 may include a socket for receiving an expecially designed rotating tool, or an exotic rotating tool not normally associated with the immediate art. Keys for hexagonal and for fluted socket head screws are not widely possessed.

FIGS. 2 and 3 illustrate an alternate embodiment of the instant invention including ball component 14 as previously described. Attachment bolt 40, in general similarity to attachment bolt 23, has an externally threaded shank 42, with first and second ends 43 and 44, respectively. Shank 42 extends upwardly through opening 13 and matingly engages internally threaded bore 22. Bore 45 extends into shank 42 from second end 44 and, in general similarity to previously described bore 30, is threaded to receive machine screw 34.

Socket 47, sized and shaped to receive a rotating tool, especially a hexagonal key, is countersunk into shank 42 from second end 44. During assembly, the rotating tool is passed through bore 32 and engaged within socket 47 for drawing bolt 40 into ball element 15 for purposes of attachment to support member 10. This eliminates the necessity of a wrench receiving head associated with attachment bolt 40. Accordingly, generally cylindrical head 48 is carried at first end 43 of shank 42. The temptation to attempt to remove attachment bolt 40 by means of a conventional wrench is thereby eliminated.

FIG. 4 illustrates yet another embodiment of the instant invention incorporating elements previously described in connection with the embodiment of FIG. 1 and the embodiment of FIGS. 2 and 3. Attachment bolt 50 includes externally threaded shank 52, having first and second ends 53 and 54, respectively, which extends upwardly through opening 13 and matingly engages internally threaded bore 22. Head 55, having flats for receiving a conventional wrench, are carried at first end 53. Internally threaded bore 57 and countersunk socket 58 extend inwardly from second end 54 for receiving machine screw 34 and a rotating tool, respectively.

Protective member 59, as also seen in FIGS. 5 and 6, encases head 55. Being generally cup-shaped, protective 59 includes a plate portion 60 and a hollow cylindrical portion 62. Opening 63 through plate portion 60 is sized and shaped to receive shank 52 therethrough.

During assembly of ball component with support member 10, shank 52 is passed through opening 63 prior to passage through opening 13 and engagement with bore 22. Subsequently, plate portion 60 is clamped between head 55 and bottom surface 12. Hollow cylindrical portion 62 closely receives head 50. Accordingly, access to head 55 for engagement with a conventional wrench or other rotating is denied.

Various changes and modifications to the embodiments of the instant invention herein chosen for purposes of illustration will readily occur to those skilled in the art. Attachment bolts 40 and 50 are specifically shown as including sockets 47 and 58, respectively, for receiving a particular type of rotating tool. Sockets 47 and 58 are intended to be generally representative of rotating tool engagement means, such as recesses for conventional screwdrivers or engagement means for especially constructed rotating and driving tools. Similarly, bolt 37 was chosen of being representative of a cammingly engageable member having a pitch different than the pitch of the attachment bolt. Specifically, the threads on shank 34 are considered the male element of a male-female connection pair, while the threads within bores 30, 45 and 57 are considered the female element of a male-female connection pair. The male-female connection pair are rotatably and cammingly engageable. It is anticipated that other rotatable and camming engagement male-female connection pairs for the purpose of performing the intended function will occur to those having regard for the instant invention. To the extent that such modifications and variations do not depart from the spirit of the invention, they are intended to be included within the scope thereof which is limited only by the following claims.

Having fully described and disclosed the present invention and alternately preferred embodiments thereof in such clear and concise terms and to enable those skilled in the art to understand and practice the same, the invention claimed is:

1. In a coupling apparatus including a ball component having
   a base,
   a ball element carried by said base, and
   an internally threaded bore extending upwardly from said base, and including an attachment bolt having
   an externally threaded shank having first and second ends and matingly engageable within said internally threaded bore,
   the threads of the internal threaded bore extending upwardly from said base and of the externally threaded shank of the attachment bolt having a thread pitch of a first valve, and
   a head carried at the first end of said shank, for attachment to a support member having
   a top surface for receiving said base thereagainst,
   a bottom surface for receiving said head thereagainst, and
   an opening for receiving said shank therethrough, and for detachable engagement with a complemental coupler component having a socket for receiving said ball element, improvements therein for detachably securing said ball component to said support member, said improvements comprising:
   (a) locking member including
      i. an elongate shank,
      ii. a head carried at one end of said shank, and
      iii. external threads formed on said shank;
   (b) internal threads are formed in a bore formed in said externally threaded shank from the second end thereof matingly engageable with the threads on said elongate shank, the external threads of the shank of the locking member and the internal threads formed in the bore formed in the shank of the attachment bolt having a thread pitch having a second value substantially different from that of the first value; and
   (c) a bore in said ball component coaxial with said externally threaded shank for receiving said elongate shank therethrough said head of the locking member when screwed into the bore formed in the shank of the attachment bolt engaging the ball component, whereby attempted rotation of the attachment bolt to loosen same will jam the head of the locking member against the ball component to resist further attempts to loosen the attachment bolts.

2. The improved coupling apparatus of claim 1, wherein the thread pitch of the first value is less than the thread pitch of the second value.

3. The improved coupling apparatus of claim 2, wherein all said threads are right-hand threads.

4. The improved coupling apparatus of claim 1, wherein the head of said locking member includes a recess for receiving a rotating tool, said recess being rendered inaccessible when said ball element is engaged within said socket.

5. The improved coupling apparatus of claim 1, wherein the head of said attachment bolt is generally cylindrical.

6. The improved coupling apparatus of claim 5, further including a rotating tool receiving socket formed in the first end of said externally threaded shank of the attachment bolt.

7. The improved coupling apparatus of claim 1, further including a generally cup-shaped protective member for receiving and encasing the head of said attachment bolt and having an opening for receiving said externally threaded shank therethrough.

* * * * *